United States Patent [19]

Seazholtz et al.

[11] Patent Number: 5,333,173

[45] Date of Patent: Jul. 26, 1994

[54] PERSONAL CHECKUP SERVICE AND EQUIPMENT

[75] Inventors: John W. Seazholtz, Great Falls; Brian L. Carrier, Mechanicsville, both of Va.

[73] Assignee: Bell Atlantic Network Services, Inc., Arlington, Va.

[21] Appl. No.: 775,408

[22] Filed: Oct. 15, 1991

[51] Int. Cl.$^5$ .................... H04M 11/00; H04M 11/04
[52] U.S. Cl. ...................... 379/45; 379/38; 379/46; 379/51; 379/88; 379/89
[58] Field of Search ............... 379/38, 39, 40, 41, 379/45, 51, 88, 89, 84, 46

[56] References Cited

U.S. PATENT DOCUMENTS

| | | | |
|---|---|---|---|
| 4,219,698 | 1/1980 | Birilli et al. | |
| 4,237,344 | 12/1980 | Moore | |
| 4,303,801 | 12/1981 | Anderson et al. | 379/38 |
| 4,371,751 | 2/1983 | Hilligoss et al. | 379/40 |
| 4,417,100 | 11/1983 | Carlson et al. | |
| 4,491,970 | 1/1985 | LaWhite et al. | |
| 4,510,350 | 4/1985 | Wagner | |
| 4,524,243 | 6/1985 | Shapiro | 379/38 |
| 4,565,902 | 8/1986 | Phillipps et al. | |
| 4,580,012 | 4/1986 | Matthews et al. | 379/89 |
| 4,743,892 | 5/1988 | Zayle | 379/38 |
| 4,881,252 | 11/1989 | Jones et al. | |
| 5,023,901 | 6/1991 | Sloan et al. | 379/38 |
| 5,170,426 | 12/1992 | D'Alessio et al. | 379/38 |
| 5,195,126 | 3/1993 | Carrier et al. | 379/51 |

Primary Examiner—Curtis Kuntz
Assistant Examiner—Stella L. Woo
Attorney, Agent, or Firm—Lowe, Price, LeBlanc & Becker

[57] ABSTRACT

A method and apparatus for utilizing a public switched telephone network which includes a voice messaging system (VMS) for providing to subscribers a checkup call service to initiate at times determined by the subscriber checkup calls to a premise designated by the subscriber. If a particular person at the premise does not respond appropriately to the personal checkup call or the telephone goes unanswered or is off-hook for a specified period of time a list of persons designated by the subscriber is notified of such failure to respond. The service is based upon utilization of the existing VMS equipment. The subscriber has the option to specify an activation schedule which specifies the days of the week on which the service is to be active. An activation schedule disable and enable control is provided. In a second mode the checkup is effected via a customer premise equipment (CPE) device which may be wall-mountable or stand alone and connected to the telephone network. The person under surveillance is instructed to press a response button on the CPE device during a predesignated response period. Upon the button not being depressed during the response period the CPE device automatically out-dials to the VMS and the VMS initiates the notification process.

25 Claims, 6 Drawing Sheets

FIG. 5

PERSONAL CHECKUP SERVICE AND EQUIPMENT

TECHNICAL FIELD

The present invention relates to safety and security communications and, in particular, to such systems integrated with and supplementary to public switched telephone networks providing enhanced telecommunications services.

BACKGROUND ART

There is a recognized need for promptly providing appropriate notification to cognizant entities in the event of the occurrence of emergency or precautionary situations. The now familiar 911 telephone service has evolved in response to the emergency aspect of that need. Other alarm systems utilizing the public switched telephone network have been proposed. In general these provide a resident with a means for initiating an alarm signal which is delivered to designated telephone numbers. A notification to the 911 service may also be provided. Several such arrangements are described in detail in the assignee's co-pending U.S. patent application Ser. No. 07/697,380, filed May 9, 1991, in the name of Brian L. Carrier et al.

DISCLOSURE OF THE INVENTION

The present invention addresses a further need of a class of persons requiring a greater or lesser degree of surveillance without necessitating personal initiation of an alarm signal. In essence the invention provides a personal checkup service which will furnish to involved individuals safety, security and peace of mind for their family, friends and home. The service insures that several people will be notified in the event of an immediate care need at a subscriber or customer's home. The notification is triggered when a particular person at the residence does not respond appropriately to the personal checkup service (PCS) system, or the telephone goes unanswered or is off-hook for a specified period of time. The service is particularly adapted to two primary groups, namely, families with children (particularly "latch key" children), and those who are care givers for seniors or handicapped relatives or friends. The invention provides a simple, inexpensive, high quality, feature-rich service which offers peace of mind, allows customers to "show they care", and to "know someone is always there".

According to the invention the customer or subscriber is provided with full control over the identity of the persons to be notified and the flexibility of changing the specific functioning of the system. This includes the establishment and/or modification at any time of such parameters as the content of the Notification Message, the identity and number of persons in the Notification List, the content of the Checkup Message, the Checkup Time, and the like. The subscriber has the flexibility to forward the Notification Message to, for example, up to five directory numbers. A subscriber may desire calls to be placed to relatives or friends at home or at work, a next door neighbor, or others. The subscriber may forward the notification call to a toll number, as where parents are away on business or vacation.

An important feature of the invention is that the service is based upon utilization of the existing Voice Message System (VMS) equipment which is now used to provide Telco supplied services such as Answer Call, Voice Mail and Emerg-Alert. The notification process may be activated in any of a number of ways including the following:

As a first mode activation may be via a checkup telephone call. A Personal Checkup Service (PCS) telephone call is placed via the local Telco VMS to the subscriber's home at a predesignated time (Checkup Time) to check on family members, friends, or the residence itself. If someone is at home they will answer the telephone and the telephone will play their Checkup Message and prompt them to enter their PCS Call Password to indicate that everything is satisfactory. Alternatively the subscriber may choose not to have a password. If the telephone is busy, the VMS will continue to redial the subscriber's residence at designated intervals (e.g., every five minutes) until a connection is made. If the telephone goes unanswered after several redial attempts, or goes unanswered for a predesignated period of time; or the password is not correctly entered, the VMS will either sequentially or simultaneously call numbers on the subscriber's Notification List (e.g., parents at work, neighbors) and deliver the Notification Message.

Although the Notification Message will not identify the nature of the situation, it will notify others that an immediate care situation exists. This message will be repeated several times to insure that the called party can record the pertinent information. If the first called party on the Notification List does not answer or the line is busy, the VMS calls the second party; if the second party does not answer or the line is busy, the VMS calls the third party; and so on. When at least two members of the Notification List have confirmed receipt of the Notification Message, the VMS discontinues calling.

The subscriber has the option to specify an Activation Schedule which specifies those days of the week on which they desire the PCS to be active. For example, the Activation Schedule may designate Monday through Friday only.

As a second mode activation may be effected via a Customer Premise Equipment (CPE) device. Such a CPE device may be wall mountable or stand alone and may be connected between the telephone and a standard RJ11 telephone jack in the subscriber's home. Alternatively the CPE device is connected to any telephone line termination node in the subscriber's home. According to this mode the person under surveillance is instructed to press a Response Button on the CPE during a predesignated PCS Response Period, such as between 9 a.m. and 11 a.m. Upon the button being depressed the CPE device automatically out-dials to the VMS; the VMS responds; the CPE device provides a DTMF or other signaling format tone to the VMS; the VMS provides a confirmation DTMF or other signaling format tone back to the CPE device if the SMDI information (i.e., calling number identification) is received by the VMS; and the CPE device disconnects. If the VMS does not provide a confirmation tone within a specified time period such as ten seconds, the CPE device disconnects and continues to redial the VMS until a confirmation tone is received.

If the person at the residence does not press the Response Button within the PCS Response Period, the VMS sequentially calls the parties on the Notification List as described in the first sequence above.

Again the subscriber will have the option to specify an Activation Schedule which specifies which days of the week they wish the PCS to be active, such as Monday through Friday only.

The CPE device is also provided with a Disable Button which disables the PCS service while leaving intact the subscriber's Activation Schedule in the VMS. For example, the subscriber may desire to leave for the day or go on vacation for the weekend. By depressing the Disable Button the subscriber disables temporarily the Activation Schedule. The CPE device is also provided with an Enable Button which effects reinstatement and activation of the Activation Schedule. The depression of each button calls upon the VMS to either disable or reinstate the PCS service as the case may be. The subscriber can also call the VMS to disable or reinstate their PCS service via the PCS User Menu on the VMS.

Activation via an off-hook condition. If the subscriber's telephone is left off-hook (with no voice) for a predesignated period of time such as ten minutes, the network will notify the VMS. The VMS will call the customer's home to verify the off-hook/no voice condition. Upon confirmation of the condition, the VMS calls the Notification List as described in the first sequence above.

Activation via a no answer condition. If the subscriber's telephone goes unanswered for a pre-designated number of rings the network will notify the VMS. Alternatively, Call Forwarding service may be utilized to notify the VMS of the no answer condition. The VMS then calls the subscriber's home to verify the no answer condition. Upon confirmation of the no answer condition, the VMS calls the Notification List as described in the first sequence above.

In addition to the foregoing the service of the invention may also include medical or security monitoring by trained personnel at a monitoring center. If the Notification Process is activated and the VMS cannot reach anyone on the Notification List, the VMS will contact the monitoring center. The center will then call the customer to determine what 911 emergency assistance or other assistance is needed, if any. If the customer does not answer the call from the monitoring center, the center will summon 911 services. Alternatively, upon activation of the Notification Process the VMS may immediately contact the monitoring center instead of calling the Notification List first.

According to the invention the subscriber may specify any of the various PCS options from any touch tone telephone. These options are programmed by the subscriber at the time of service initiation and may be changed at any time by the subscriber. To establish or change the PCS options, the subscriber is required to access the PCS User Menu on the VMS and input their Access Password. The following options then may be programmed:

a) Access password. This is the password which the subscriber utilizes to access their PCS mailbox and change their PCS options.

b) Notification List. This constitutes the list of called parties designated to receive the Notification Message.

c) Notification Message. This is the message which is delivered to the called parties on the Notification List. The subscriber has the option to create their own personalized message or choose the standard System Notification Message which specifies the subscriber's name, address, telephone number, and time of PCS activation.

d) Activation Schedule. This constitutes a pre-designation of the days of the week the PCS service is active.

e) Checkup Message. This constitutes the message played when the person at the subscriber's residence answers the PCS call from the VMS.

f) Checkup Time. This constitutes the time at which the VMS begins calling the subscriber's residence. PCS calls are repeated for a specific period of time before the Notification Process is activated.

g) PCS Call Password. This constitutes the password which must be inputted when the PCS call is answered at the residence. Alternatively the subscriber may chose not to have a password.

h) PCS Response Period. This constitutes the time period in which the person must push the Response Button on their CPE device.

When each person or directory number on the Notification List goes off-hook they hear the Notification Message repeated several times. They are asked to press a DTMF key to confirm receipt of the message. This feature provides a record of when and to which telephone numbers a message was delivered. If they do not have a DTMF telephone to confirm receipt of the message, the VMS will call back to insure the message was received.

It is an important feature of the present invention that the PCS service is superimposed on the same equipment utilized by existing VMS services such as Answer Call, Voice Mail, and the like. Since the PCS service of the invention leverages existing investment in VMS equipment it requires relatively moderate capital investment. At the same time the service of the invention requires minimal equipment usage since traffic and storage requirements are low. Current VMS technology is capable of providing most of the functions.

Accordingly it is an object of the present invention to provide an improved Personal Checkup Service which furnishes to residential customers safety, security and peace of mind for their family, friends and home.

It is another object of the invention to provide such an improved Personal Checkup Service where the subscriber has control over the identity of persons and directory numbers to be notified and the flexibility of changing various options as to the content of the Notification Message, the identity of persons or numbers in the Notification List, the content of the checkup Message, the Checkup Time and other parameters at any time.

It is another object of the invention to provide such an improved Personal Checkup Service which is capable of implementation with existing public switched telephone network equipment and thus is susceptible of relatively rapid installation and operation at reasonable cost and with a high degree of reliability.

Still other objects and advantages of the invention will become readily apparent to those skilled in the art from the following detailed description wherein a limited number of preferred embodiments of the invention are shown and described, simply by way of illustration of the best mode contemplated of carrying out the invention.

As will be realized the invention is capable of other and different embodiments, and its details are capable of modification in various obvious respects, all without departing from the invention. Accordingly the drawing and description are to be regarded as illustrative in nature and not as restrictive.

BRIEF DESCRIPTION OF DRAWINGS

The invention will be more fully understood from the following detailed description taken in conjunction with the accompanying drawings, in which.

BEST MODE FOR CARRYING OUT THE INVENTION

Figures 1, 1A:
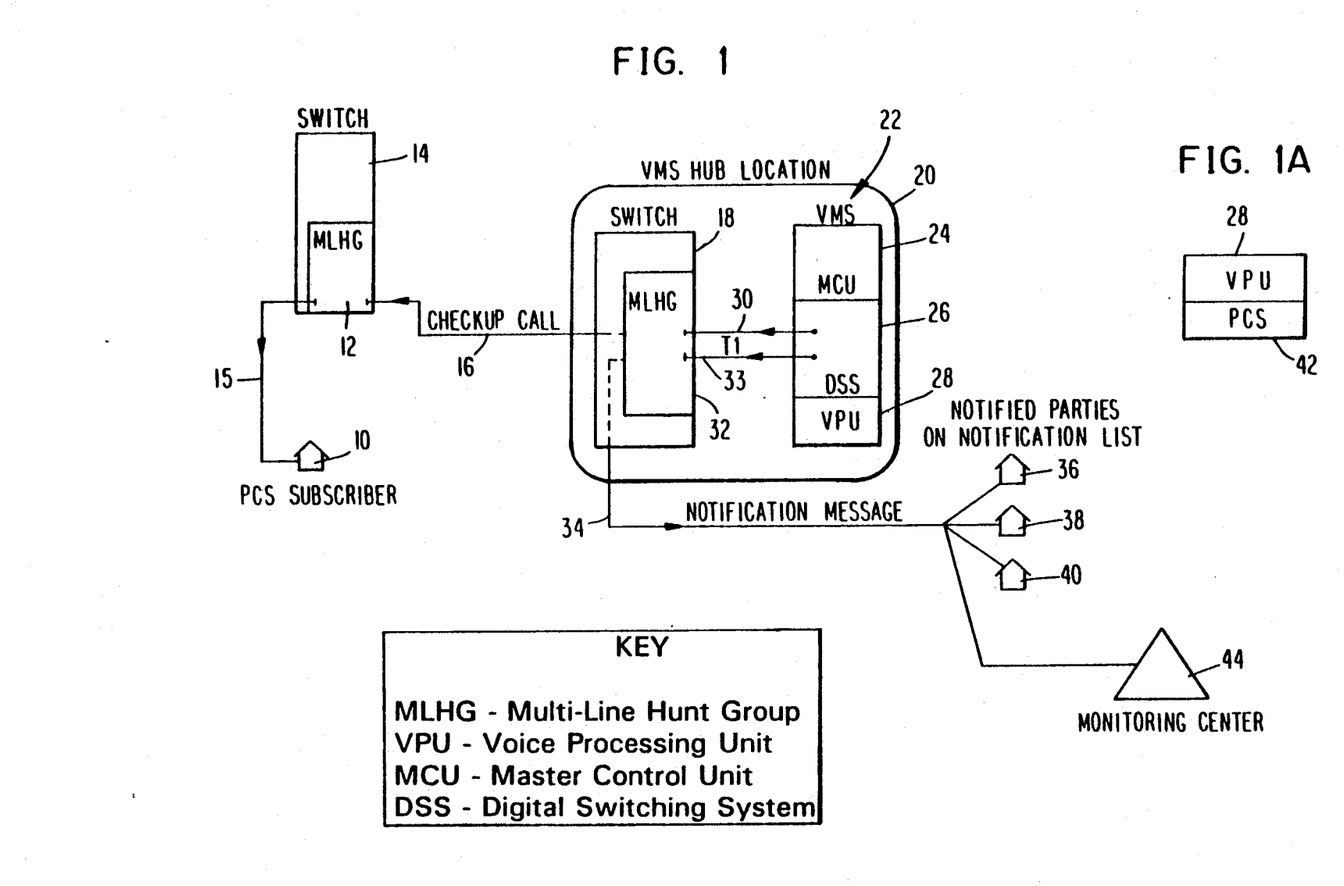
FIG. 1 is a diagrammatic illustration of a first embodiment of the invention showing activation via a PCS check up call.
FIG. 1A is a detailed break-out of the Voice Processing Unit (VPU) of FIG. 1.

Referring to FIG. 1 there is shoe at 10 a PCS subscriber or customer station which represents a subscriber to the new Personal Checkup Service. The station 10 may be connected to a multi-line hunt group 12 in an end office (EO) containing a switch 14. The MLHG 12 in the switch 14 is connected by a local loop 15 to the subscriber station 10 and by a trunk 16 to a program controlled switch 18 at a Voice Message System (VMS) hub site 20.

Located at the VMS hub site 20 is a VMS platform indicated generally at 22. The VMS platform includes a master control unit (MCU) 24, digital switching system (DSS) 26, and voice processing unit (VPU) 28. The VMS platform is connected from the DSS via a T1 link 30 to a multi-line (MLHG) 32 associated with the program controlled switch 18 to communicate with the subscriber station 10. The VMS is also connected to the MLHG 32 through a T1 link 33 to communicate with the destination stations. The switch 18 and MLHG are connected through a suitable link 34 to the destination telephone stations (DTS) 36, 38 and 40 of parties designated to be notified of the safety/security situation. The link 34 may constitute a single line connected to a single switch port or may consist of plural lines connected to multiple ports. The system of the invention may utilize sequential or simultaneous notification of the designated parties. Plural lines and ports are necessary for simultaneous notification.

The VPU 28 in the VMS 22 conventionally contains mailbox storage capacity for multiple voice messaging applications. According to the invention the PCS storage is provided in the same VMS platform but is distinct from and in addition to the storage utilized in existing VMS services. The mailbox storage for the PCS service is provided in the VPU 28 at 42 as illustrated in FIG. 1A. This usage of the same VMS platform permits common and efficient usage of existing equipment and minimizes the investment required to initiate the new service of the invention.

Also connected to the link 34 is a monitoring center 44 presently to be described.

The embodiment of the invention illustrated in FIG. 1 is basically designed for activation via a PCS checkup call. According to this embodiment the VMS 22 initiates a call to the PCS subscriber 10 at a predesignated time that the subscriber has entered into the VMS program. The subscriber has control over the time entered and the number of times per day that the call is to be initiated. At the checkup time the telephone in the subscriber home will ring and if someone is present the telephone will be answered. At this point the VMS plays the Checkup Message and prompts the answering person to enter the PCS Call Password to indicate that everything is satisfactory.

The subscriber is given the option to use or not use a password. An alternative to password usage is the provision of voice recognition which may be provided according to another embodiment of the invention. An example of a Checkup Message may be: "Hello. This is the Bell Atlantic Personal Checkup System with a Checkup Message for (the person's name)." The message may also include a subscriber entered reminder of which medicines are to be taken that day, such as "Have you taken medicine A at 9 o'clock and medicine B at 10 o'clock?" For children the same introductory type message may be utilized but the questioning may be directed to whether or not the house is locked or dinner has been started.

If the telephone is busy the VMS continues to redial the residence at designated intervals that may or may not be at the subscriber's discretion. By way of example, the number may be redialed every five minutes or half hour. In the five minute mode if the line is busy for half an hour then the VMS may activate the PCS Notification Process.

If the telephone of the PCS subscriber station is unanswered after several redial attempts the Notification Process may be actuated. Alternatively the Notification Process may be actuated if the telephone goes unanswered for a predesignated period of time, if the password is not correctly entered, or alternatively, if the voice recognition does not match. As previously stated, the notification sequence may be either sequential or simultaneous.

Once the Notification Message is sent the called parties cannot identify the precise nature of the situation but is on notice that a potential problem situation exists. When the called party answers the message is repeated several times to make certain that the answering party hears the message and has an opportunity to make notes. In the sequential embodiment if the first person on the Notification List does not answer or if the telephone is busy the VMS will go on to the second party, and if the second party does not answer or is busy to the third, and so on. The VMS may be programmed to continue the sequential notification until at least a pre-designated number of persons have been notified, such as two persons listed on the Notification List have confirmed receipt of the message. The confirmation is preferably in the form of touching a DTMF key. When the pre-established number of persons have confirmed notification the VMS discontinues calling.

The subscriber will input an activation schedule which will basically specify the days of the week that they desire the service to be performed. For example, Monday through Friday might be applicable for messages intended for children returning home from school.

Figure 5:
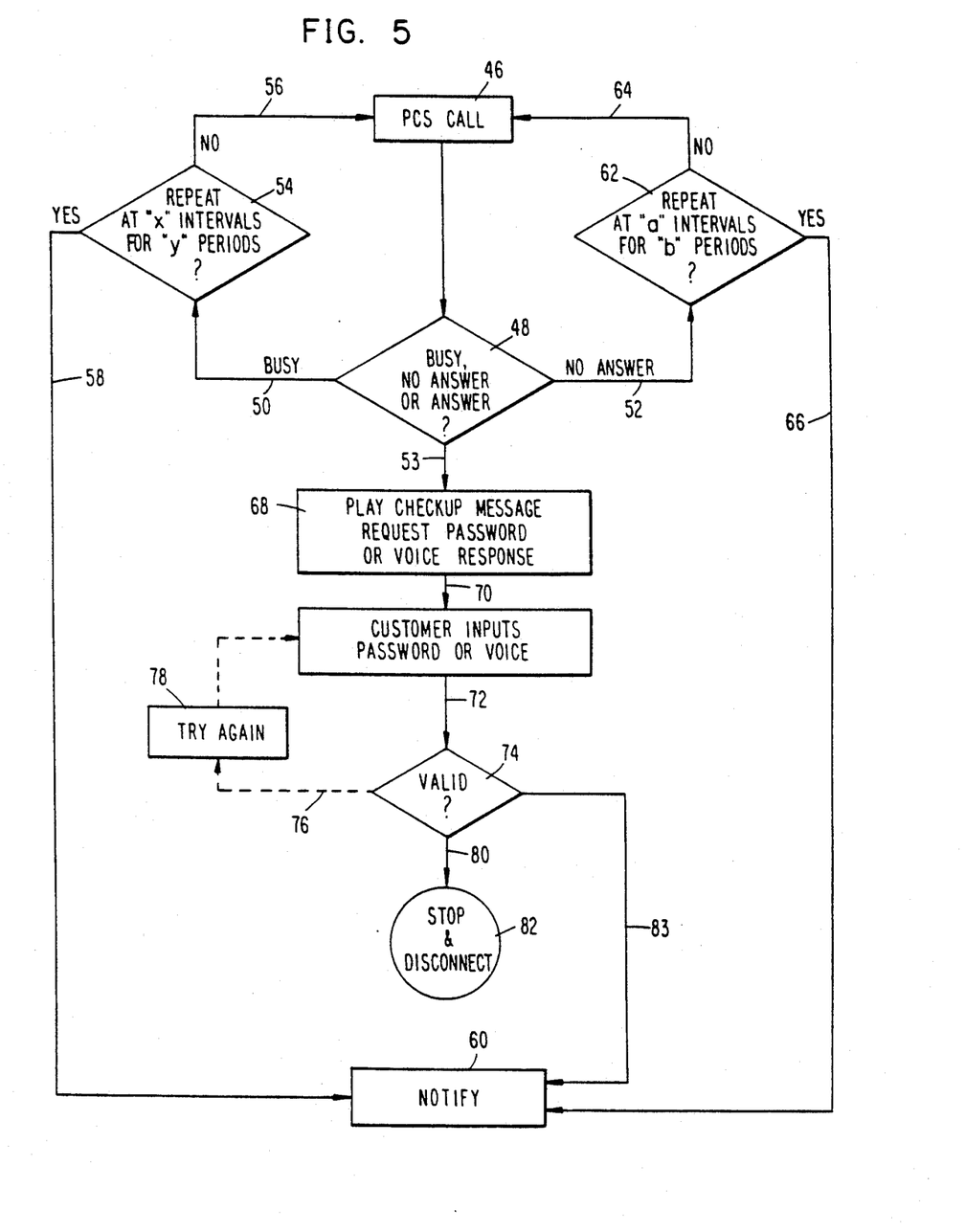
FIG. 5 shows a flow chart of the operation of the invention using a Checkup Call.

The operation of the embodiment of the invention illustrated in FIG. 1 is now described in conjunction with the flow chart of FIG. 5.

Prior to operation the VMS/PCS platform must be initialized. Such initialization involves entry of the following:

a) Access Password
b) Notification List
c) Notification Message
d) Activation Schedule
e) Checkup Message
f) Checkup Time
g) PCS Call Password
h) PCS Response Period The entry of such options may be in the manner described in detail in assignee's co-pending Carrier et al patent application Ser. No. 07/697,380 referenced hereinabove.

Referring to FIG. 5, operation of the system commences with the PCS call at 46. The call comes in to the residence and at 48 the decision is made as to whether the line is busy, as indicated at 50; there is no answer, as indicated at 52; or the call is answered, as indicated at 53. If the line is busy the call is repeated at a predetermined time interval for a predetermined time period. The determination as to whether or not the call has been repeated at "x" intervals for a "y" time period is made at 54. When the predetermined "x" and "y" intervals and time period variables have been equaled or exceeded the system proceeds as indicated at 58 to activation of the Notification Process at 60.

The no answer condition indicated at 52 proceeds in a similar manner at predetermined intervals "a" for a predetermined "b" time period as indicated at 62. The calls are repeated so long as these limiting parameters have not been equaled or exceeded as shown at 64. When the calls have been made "a" times for a time interval of "b" the Notification Procedure 60 is activated as indicated at 66.

Assuming that the PCS call was answered as indicated at 53, the Checkup Message is played and the password is requested at 68 if such is in use. Alternatively the voice response may be tested against an appropriate voice recognition templet. Assuming a password request as indicated at 70 the customer or subscriber inputs the requested password or speaks in the voice recognition tested voice as indicated at 72. Validity is tested at 74. A repeat request may be programmed as indicated by the broken lines at 76 and 78.

If the validity test at 74 indicates an affirmative answer, as shown at 80, the program is stopped and disconnected at 82. If the validity test at 74 results in an invalidity determination this initiates the Notification Process as shown at 83 and 60.

Figures 2, 2A:
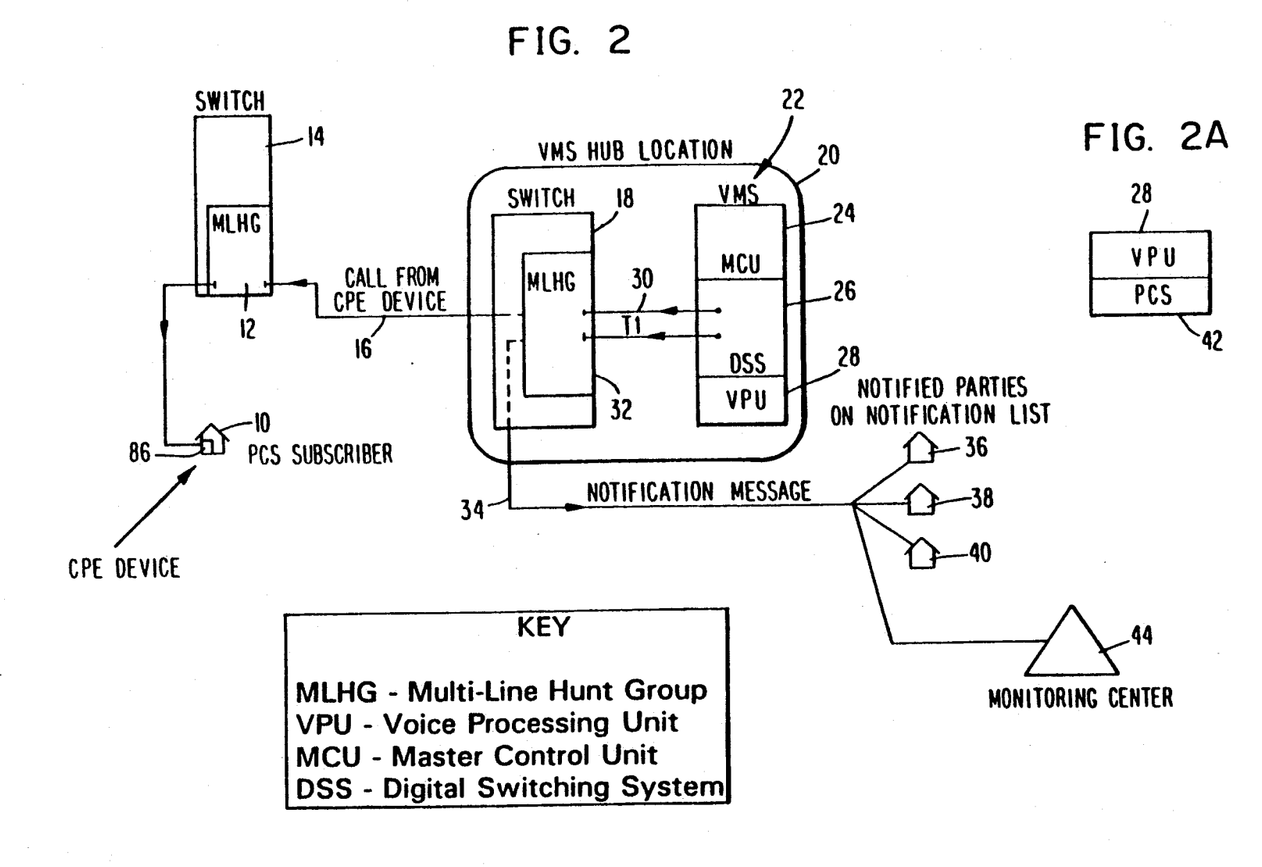
FIG. 2 is a diagrammatic illustration of another embodiment of the invention involving activation via a Customer Premise Equipment device.
FIG. 2A is a detailed break-out of the Voice Processing Unit (VPU) of FIG. 2.

Referring to FIG. 2 there is shown a second embodiment of the invention. The system diagram is in general similar to that in FIG. 1 and like reference numerals are utilized where applicable. In this embodiment of the invention a customer premise equipment (CPE) device 86 at subscriber station 10 is utilized to initiate a call which may also be called a response. A typical device of this type is illustrated at 86 in FIG. 8. The device 86 comprises a small self-contained housing 88 having a Response Button 90, Enable Button 92 and Disable Button 94. The unit 86 is also provided with a pair of connector jacks 96 and 98 which may comprise RJ11 jacks for effecting connection to the customer premise equipment and telephone network. Two alternative types of connections are illustrated in FIG. 6 and 7.

Figure 6:
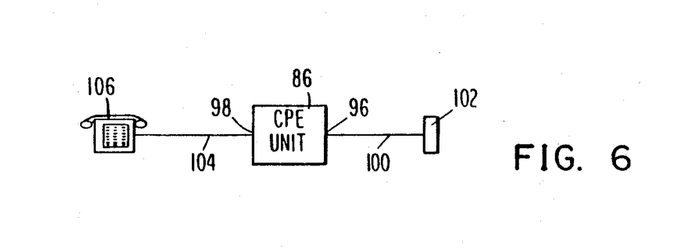
FIG. 6 shows the connection of a CPE unit in the residence according to one embodiment of the invention.
Figure 7:
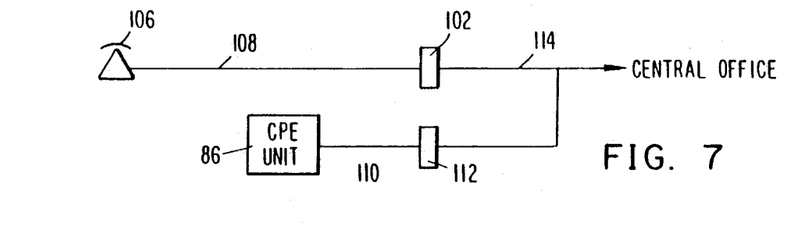
FIG. 7 shows the connection of a CPE unit in a residence according to another embodiment of the invention.

Referring to FIG. 6 the CPE unit 86 has its "IN" jack 96 connected by connector 100 to an RJ11 jack 102 connected to the telephone network node in the premise. The "OUT" jack 98 of the CPE unit 86 is connected via connector 104 to the subscriber's telephone station 106. The connection of the CPE unit 86 to the telephone network is a bridging type connection and does not necessarily require "IN" and "OUT" connections. Thus referring to FIG. 7 there is shown an embodiment wherein the telephone station 106 is directly connected to the termination node RJ11 jack 102 by its conventional connector 108. The CPE unit 86 is connected by a single connector 110 to an RJ11 jack 112 which is also connected to the local loop or other connection to the central office indicated at 114. The jack 112 may also be regarded as the termination node. Thus there is no necessity that requires the CPE unit 86 to be inserted in the existing connection between the telephone 106 and premise RJ11 jack 102. A connection of the FIG. 6 type is frequently convenient in that it is unnecessary to locate any premise mounted RJ11 connection. The device can be connected completely at the telephone instrument by removing the existing RJ11 plug and inserting the same into the "IN" jack 96 in the CPE unit 86. An extra connector 104 may then be inserted between the "OUT" jack 98 of the CPE unit 86 and the telephone 106. This eliminates the necessity of searching behind furniture for the RJ11 jack into which the telephone is connected.

Figure 8:
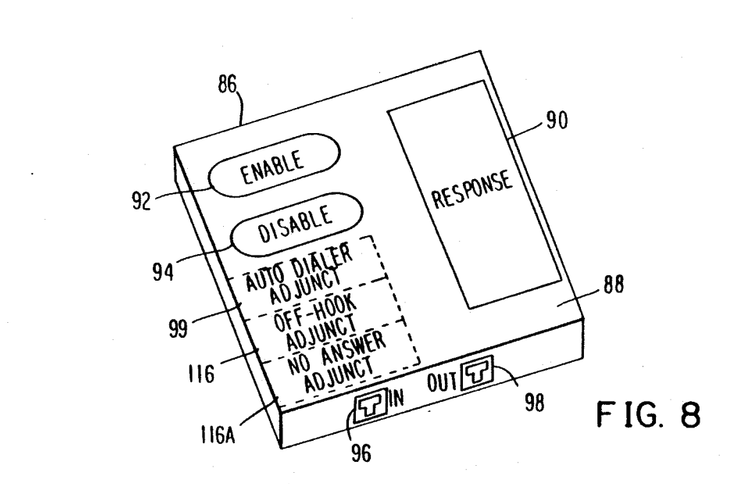
FIG. 8 shows a typical CPE unit in perspective.

The operation of the CPE unit 86 is as follows: According to a pre-arranged schedule the person at the subscriber's residence will push the Response Button 90 on the CPE device 86 during a predesignated PCS Response Period, such as between 9 a.m. and 11 a.m., to indicate that all conditions are satisfactory. The Response Button 90 on CPE unit 86 is arranged so that when depressed the CPE device 86 actuates an autodialer adjunct 99 to initiate a call to the VMS. The VMS answers or goes off-hook. The CPE device 86 then provides a DTMF tone (DTMF or other signaling format) to the VMS; the VMS then provides a DTMF confirmation tone or other signaling format back to the CPE unit if the SMDI (Simplified Message Desk Interface) information (i.e., calling number of the customer's residence) has been received by the VMS; and the CPE device disconnects. Alternatively, the VMS may utilize Caller ID or Automatic Number Identification (ANI) to obtain the calling number information. If the VMS does not provide a confirmation tone within a specified time period such as, for example, 10 seconds, the CPE device disconnects and continues to redial the VMS until a confirmation tone is received.

If the person at the residence does not press the Response Button within the PCS Response Period, the VMS calls the residence first to insure that the person did not forget to press their Response Button. If there is no answer or if the telephone is busy, the VMS will sequentially call the parties on the Notification List as described in connection with FIG. 1.

As in the embodiment of FIG. 1 the subscriber has the option to specify an Activation Schedule which specifies which days of the week they desire to have the PCS active, such as Monday through Friday only.

The Disable Button 94 in the CPE unit 86 disables the PCS while leaving the customer's Activation Schedule intact in the VMS. For example, the subscriber may desire to leave for the day or go on vacation for the weekend. The Enable Button 92 permits the customer to reinstate the PCS function upon return. For both buttons the CPE unit calls the VMS to either disable or reinstate the PCS. The customer may also call the VMS to disable or reinstate their PCS via the PCS user menu on the VMS.

According to one feature of the invention the subscriber may be provided with a reminder to remind the subscriber when they have disabled their PCS. Thus after the PCS has been disabled for a specified period of time, the VMS may call the subscriber to remind them to enable their PCS. According to an alternate reminder method, when the subscriber accesses their PCS User Menu a voice prompt will remind them that the PCS has been disabled.

The disabling may be effected either by sounding a predetermined tone, as described, or may be effected by which 7 digit number within a multi-line hunt group the disable signal arrives on. For one 7 digit number the signal may cause disablement and for another 7 digit number the signal may cause re-enablement. The incoming call includes the SMDI calling number or Caller ID or ANI calling number and when that calling number is delivered to the mailbox on a specific 7 digit line the function is carried out. The CPE device 86 auto-dialer adjunct unit may be used for this purpose.

Figure 9:
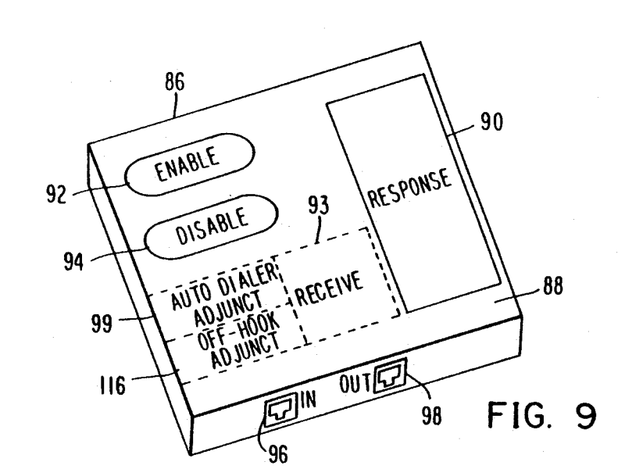
FIG. 9 shows another embodiment of a CPE unit in perspective.
Figure 10:
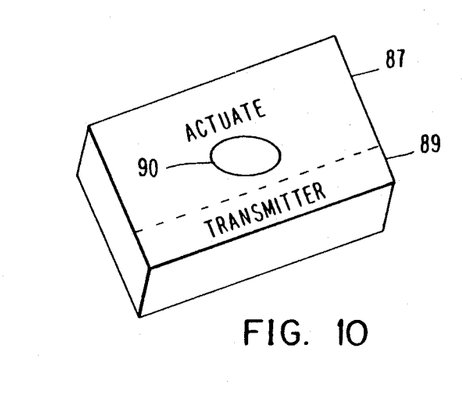
FIG. 10 shows a remote CPE actuator unit in perspective.

While the CPE unit 86 is wired to the telephone or telephone network termination node in the customer premise it is also within the purview of the invention to utilize a totally portable remote unit which may be carried by the person who is the identified subscriber. According to this embodiment of the invention there is provided a remote module 87 illustrated in FIG. 10. The module contains a battery powered radio or infrared transmitter 89 which may be actuated by an Actuate Button 91. The portable module 87 may be provided in any convenient form such as a belt-mounted unit, wristwatch, pendant, necklace or the like. The transmitter cooperates with a receiver 93 within a CPE unit 86 shown in FIG. 9. On depression of the Actuate Button 91 the transmitter 89 emits a radiated signal which is detected by the receiver 93. The receiver thereupon generates a signal which is effective to close the response switch 90. With this arrangement it is unnecessary for the involved person to actually travel to the telephone or module 86 in order to provide the scheduled call or response.

According to another feature of the invention there is provided a means for detecting an off-hook condition with no voice for a period of time exceeding a predetermined period, for example 10 minutes. In such a situation the invention provides for a call to the VMS. The VMS then attempts to call the subscriber's home to verify the existence of the off-hook/no voice condition. Upon verifying such a condition the VMS thereupon initiates the Notification Process as described in connection with the embodiments of the invention illustrated in FIGS. 1 and 2.

Figures 3, 3A:
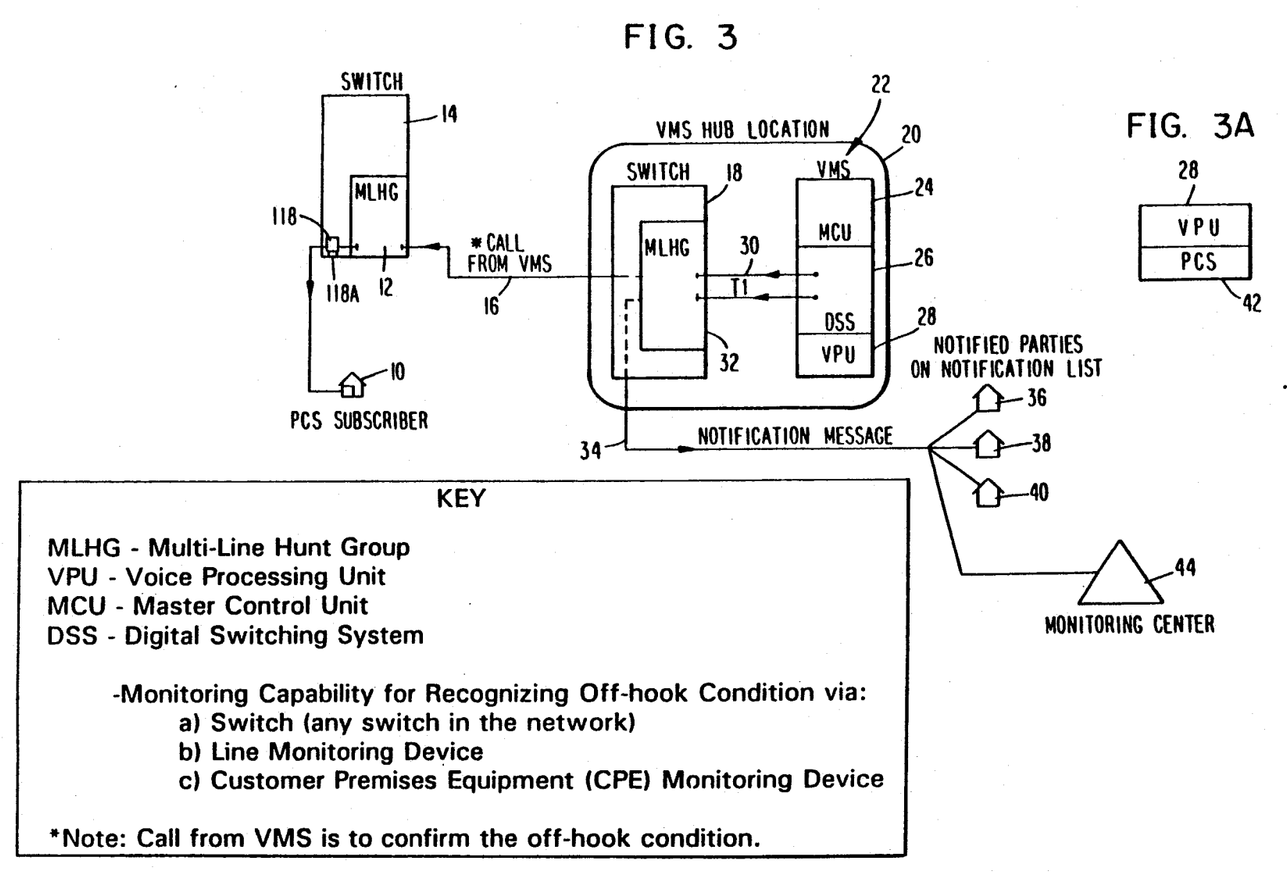
FIG. 3 is a diagrammatic illustration of another embodiment of the invention involving activation via an off-hook condition.
FIG. 3A is a detailed break-out of the Voice Processing Unit (VPU) of FIG. 3.

This feature of the invention may be carried out either by the use of a CPE device adjunct or by the use of equipment in the telephone network. Referring to FIGS. 3 and 8, the CPE device 86 may have mounted therein a line monitor adjunct programmed to detect an off-hook/no voice condition that extends beyond a predetermined time limit, such as 10 minutes. This may be done by detection of the haller tone for a preset period. The off-hook adjunct is indicated in FIG. 8 by the broken lines at 116. When the off-hook adjunct 116 detects the pre-established off-hook/no voice condition it generates a signal to actuate the CPE auto-dialer 99 to notify the VMS. This may be accomplished by the adjunct on detecting the condition, disconnecting from the subscriber's telephone, going on-hook, off-hook, and then effecting auto-dialing and DTMF signaling (or other signaling format), returning to off-hook, and reconnecting to the subscriber's telephone. The VMS thereupon attempts to call the subscriber's home to verify the off-hook/no voice condition. Upon confirmation of such condition the VMS calls the Notification List as described.

FIG. 3 also shows an alternate mechanism for effecting this sequence. In this embodiment the end office switch 14 to which the PCS subscriber 10 is connected has on the line side of that connection a monitor 118 for detecting the continuing off-hook/no voice condition. The monitor may include an auto-dialer adjunct to serve the same function as described in connection with the CPE embodiment described in connection with FIGS. 3 and 8 above. The auto-dialer notifies the VMS; the VMS confirms the condition; and upon detecting the condition the VMS calls the Notification List as described.

Figures 4, 4A:
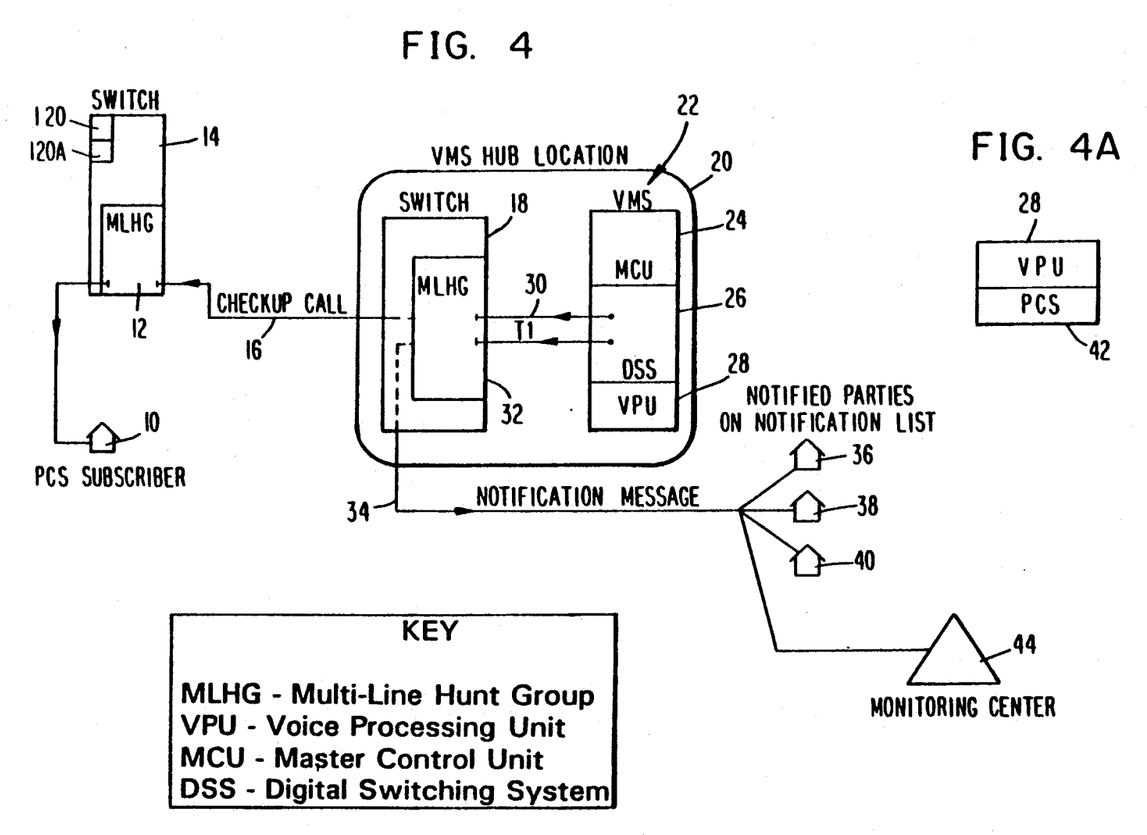
FIG. 4 is a diagrammatic illustration of another embodiment of the invention involving activation via an off-hook condition.
FIG. 4A is a detailed break-out of the Voice Processing Unit (VPU) of FIG. 4.

Referring to FIG. 4 there is shown yet another embodiment for carrying out the off-hook/no voice alarm function. According to this embodiment of the invention the end office switch 14 is provided with a monitor-/auto-dialer adjunct indicated at 120. The monitor adjunct 120 carries out the same function as the monitor 118 in FIG. 3 so that upon detection of the off-hook/no voice condition the VMS is notified; the VMS attempts to call the subscriber the verify the condition; and if the condition exists initiates the Notification Process. While the monitor adjunct 120 is illustrated here in the end office switch 14 it will be understood that the device and its functionality may be incorporated into any switch in the circuit between the PCS subscriber 10 and VMS hub location 20. The embodiment of FIG. 4, in contrast to the embodiment of FIG. 3, is not a line side embodiment.

The embodiments illustrated in FIGS. 3 and 4 and related figures of the drawings have been described thus far in relation to Personal Check-Up Service Action which is triggered by an off-hook/no voice condition which persists beyond a predetermined time. According to another feature of the invention this same architecture is utilized to effectuate the personal check-up service in response to or triggered by a failure to answer beyond a predetermined period of ring time, for example, 10 minutes. In such a situation the invention provides for a call to the VMS. The VMS then attempts to call the subscriber's home to verify the existence of the ringing/no answer condition. Upon verifying that such a condition exists for a second predetermined period of time the VMS thereupon initiates the Notification Process as described in connection with the embodiments of the invention illustrated in FIGS. 3 and 4 and associated FIGS. 1, 2 and 8. As described in conjunction with those figures this feature of the invention may be carried out either through the use of a CPE device adjunct or through the use of equipment in the telephone network. Thus the monitors 116, 118 and 120 may be augmented by no answer detectors or monitors 116A, 118A and 120A.

In the CPE version of this embodiment of the invention when the no answer adjunct 116A detects the preestablished no answer condition it generates a signal to actuate the CPE auto-dialer 99 to notify the VMS. This may be accomplished by the same process described in detail with respect to the operation of the off-hook adjunct 116. Similarly FIG. 3 shows the monitor 118A connected to the line side of the switch 14 for detecting the described no answer condition. This monitor may include an auto-dialer adjunct to serve in the same fashion as described with respect to the monitor 118 detecting the off-hook/no voice condition. According to the embodiment shown in FIG. 4 the end office switch 14 is provided with a monitor/auto-dialer adjunct indicated at 120A. The monitor adjunct 120A carries out the same function as the monitor 120 described with respect to the on-hook/no voice condition.

While the embodiment of FIG. 1, which is VMS initiated; and the embodiment of FIG. 2, which is subscriber initiated; and the embodiments of FIGS. 3 and 4 which are initiated by a monitor detecting an off-hook/no voice or a no answer condition have been described separately it should be understood that the various features may be provided in combination. Thus the Personal Checkup Service may include VMS surveillance for a scheduled call from the subscriber premise and it may also include in combination with that feature a VMS initiated Checkup Call at another time of the day. These features may also be provided in combination with initiation of the Personal Check-Up Service by an off-hook/no voice condition or a no answer condition.

In each embodiment of the invention described it is intended that there may also be provided an additional monitoring feature. As is illustrated in each of FIGS. 1-4 a monitoring center 44 is connected to the VMS along with the telephone stations of the notified parties on the Notification List. In each embodiment, if the Notification Process is activated and the VMS is unable to reach anyone on the Notification List, the VMS contacts the monitoring center 44 through the same type of out-dialing procedure described and delivers a predetermined message which includes the directory number of the involved customer's station. Upon receiving the notification an operator at the monitoring center utilizes the telephone network to call the customer to determine what 911 emergency assistance or other assistance is needed, if any. If the customer does not answer the call from the monitoring center, the center will summon 911 services.

As another embodiment of the invention the activation of the Notification Process causes the VMS to immediately contact the monitoring center as an alternative to calling the Notification List first.

It will be appreciated that the present invention provides an effective Personal Checkup Service which is superimposed on and utilizes the same equipment as is presently available in public telephone networks for providing VMS services such as Answer Call, Voice Mail and the like. This type of implementation permits initiation of the service with a very brief installation procedure which may be carried out at moderate cost. The service requires minimal additional usage of existing equipment since traffic and storage requirements are low. Current VMS technology is capable of providing most of the needed functions. The service permits furnishing to residential customers safety, security and peace of mind for their family, friends and home. The subscriber or customer has complete control over the identity of persons and directory numbers to be notified and enjoys maximum flexibility in changing various parameters, such as the content of the Notification Message, the identity of persons or numbers in the Notification List, the content of the Checkup Message, the Checkup Time, and the like.

In this disclosure there are shown and described only the preferred embodiments of the invention, but as aforementioned, it is to be understood that the invention is capable of use in various other combinations and environments and is capable of changes or modifications within the scope of the inventive concept as expressed herein.

We claim:

1. In a telecommunications system having a plurality of switch means interconnected by trunk means; subscriber telephone station (STS) means connected to a first of said switch means; voice messaging service (VMS) platform means including voice processing unit (VPU) means connected to said telecommunications system; said VMS platform means having first data storage means to provide voice message service responsive to said VMS platform means being accessed by an STS means; link means interconnecting said first switch means and said VMS platform means to provide to said VMS platform means the identity of an STS means calling said VMS platform means; the improvement comprising:

second data storage means associated with said VMS platform means; second data storage means having stored therein data comprising (a) first voice message data stored responsive to signals from said subscriber via a telephone station means (TSM), (b) call schedule time data stored responsive to signals from said subscriber via a TSM, (c) STS identification data stored responsive to signals from said subscriber via a TSM, (d) second voice message data stored responsive to signals from said subscriber via a TSM, and (e) data identifying destination telephone station (DTS) means stored responsive to signals from said subscriber via a TSM;

said VMS platform means responsive to said call schedule data delivering through said first switch means said first voice message data to said STS means, said VMS platform means upon failure to receive from said STS means in response to delivery of said first voice message data a signal corresponding to said STS identification data, delivering said second voice message data to said DTS means corresponding to said data identifying said DTS means.

2. A telecommunications system according to claim 1 wherein said STS identification data comprises password data.

3. A telecommunications system according to claim 1 wherein said STS identification data comprises voice recognition data.

4. A telecommunications system according to claim 1 wherein said STS identification data comprises signal data.

5. A telecommunications system according to claim 1 including off-hook/no voice detection means responsive to an off-hook/no voice condition at said STS means to generate a signal to said VMS means, said VMS means responsive to said signal delivering said second voice message data to said DTS means corresponding to said data identifying said DTS means.

6. A telecommunications system according to claim 1 including off-hook/no voice detection means responsive to an off-hook/no voice condition at said STS which persists beyond a predetermined time for generating a signal to said VMS means, said VMS means responsive to said signal delivering said second voice message data to said DTS means corresponding to said data identifying said DTS means.

7. A telecommunications system according to claim 1 including means in said second data storage means associated with said VMS platform means responsive to a predetermined number of unsuccessful by reason of no answer attempts to deliver said first voice message data to said STS means, delivering said second voice message data to said DTS means corresponding to said data identifying said DTS means.

8. A telecommunications system according to claim 5 including means in said second data storage means associated with said VMS platform means responsive to a predetermined number of unsuccessful by reason of no answer attempts to deliver said first voice message data to said STS means, delivering said second voice message data to said DTS means corresponding to said data identifying said DTS means.

9. A telecommunications system according to claim 1 wherein said second data storage means associated with said VMS platform means has stored therein data comprising second call schedule data stored responsive to signals from said subscriber via TSM; said VMS platform means upon failure to receive from said STS means a signal in accord with said second call schedule data delivering said second voice message data to said DTS means corresponding to said data identifying said DTS means.

10. A telecommunications system according to claim 5 wherein said second data storage means associated with said VMS platform means has stored therein data comprising second call schedule data stored responsive to signals from said subscriber via TSM; said VMS platform means upon failure to receive from said STS means a signal in accord with said second call schedule data delivering said second voice message data to said DTS means corresponding to said data identifying said DTS means.

11. A telecommunications system according to claim 7 wherein said second data storage means associated with said VMS platform means has stored therein data comprising second call schedule data stored responsive to signals from said subscriber via TSM; said VMS platform means upon failure to receive from said STS means a signal in accord with said second call schedule data delivering said second voice message data to said DTS means corresponding to said data identifying said DTS means.

12. A telecommunications system according to claim 8 wherein said second data storage means associated with said VMS platform means has stored therein data comprising second call schedule data stored responsive to signals from said subscriber via TSM; said VMS platform means upon failure to receive from said STS means a signal in accord with said second call schedule data, delivering said second voice message data to said DTS means corresponding to said data identifying said DTS means.

13. A telecommunications system according to claim 1 including monitor means, and means responsive to a failure of said VMS platform means to complete delivering of said second voice message data to said DTS means to connect said VMS means to said monitor means to initiate a call from said monitor means.

14. A telecommunications system according to claim 13 wherein said call from said monitor means comprises a "911" notification.

15. A telecommunications system according to claim 1 including means in said second data storage means associated with said VMS platform means responsive to an unsuccessful attempt to deliver said first voice message data to said STS means by reason of an off-hook condition existing at said STS means for a predetermined time, delivering said second voice message data to said DTS means corresponding to said data identifying said DTS means.

16. A telecommunications system according to claim 5 including means in said second data storage means associated with said VMS platform means responsive to an unsuccessful attempt to deliver said first voice message data to said STS means by reason of an off-hook condition at said STS means for a predetermined period of time, delivering said second voice message data to said DTS means corresponding to said data identifying said DTS means.

17. In a telecommunications system having a plurality of switch means interconnected by trunk means; subscriber telephone station ( STS ) means connected to a first of said switch means; voice messaging service (VMS) platform means including voice processing unit (VPU) means connected to said telecommunications system; said VMS platform means having first data storage means to provide voice message service responsive to said VMS platform means being accessed by an STS means; link means interconnecting said first switch means and said VMS platform means to provide to said VMS platform means the identity of an STS means calling said VMS platform means; the improvement comprising:

second data storage means associated with said VMS platform means; said second data storage means having stored therein data comprising (a) call schedule time data stored responsive to signals from said subscriber via a telephone station means (TSM), (b) STS identification data stored responsive to signals from said subscriber via a TSM, (c) voice message data stored responsive to signals from said subscriber via a TSM, and (d) data identifying destination telephone station (DTS) means stored responsive to signals from said subscriber via a TSM;

said VMS platform means upon failure to receive from said TSM means in accord with said call schedule data a signal corresponding to said STS identification data, delivering said voice message data to said DTS means corresponding to said data identifying said DTS means.

18. A telecommunications system according to claim 17 including subscriber premise means at the premise of the STS identified by said STS identification data having manually operable means for initiating said signal corresponding to said STS identification data.

19. A telecommunications system according to claim 18 wherein said subscriber premise means comprises an autonomous unit having switch means for actuating auto-dialer means.

20. A telecommunications system according to claim 18 wherein said subscriber premise means includes receiver means, and portable actuator means for transmitting radiation signals to said receiver means to initiate said signal corresponding to said STS identification data.

21. A method of providing a checkup service in a telecommunications system having a plurality of switch means interconnected by trunk means; subscriber telephone station (STS) means connected to a first of said switch means and including a first STS means at which said checkup is to be carried out (CSTS); voice messaging service (VMS) platform means including voice processing unit (VPU) means connected to said telecommunications system; said VMS platform means having first data storage means to provide voice message service responsive to said VMS platform means being accessed by an STS means and receipt of identification; link means interconnecting said first switch means and said VMS platform means to provide to said VMS platform means the identity of an STS means calling said VMS platform means comprising the steps of:
 establishing in the said VPU means second data storage means;
 accessing said VMS platform means via a STS means and storing in said second data storage means (a) first voice message data, (b) call schedule time data, (c) CSTS identification data, (d) second voice message data, and (e) data identifying destination telephone station (DTS) means;
 delivering said first voice message data from said VMS platform means to said CSTS means responsive to said call schedule data;
 upon failure to receive from said CSTS means a predetermined response, delivering said second voice message data to said DTS means.

22. A method according to claim 21 including the steps of:
 delivering from said DTS means a confirmation signal upon receipt of said second voice message data, and
 storing at said VMS means a record of receipt of said confirmation signal.

23. A method according to claim 21 including the steps of:
 delivering from a first DTS means a confirmation signal upon receipt of said second voice message data;
 storing at said VMS means a record of receipt of said confirmation signal from said first DTS means;
 delivering said second voice message data from said VMS platform means to a second DTS means;
 delivering from said second DTS means a confirmation signal upon receipt of said second voice message data;
 storing at said VMS means a record of receipt of said confirmation signal from said second DTS means;
 discontinuing sequential delivery of said second voice message data to DTS means upon receiving and recording a predetermined number of confirmations in accord with data in said second storage means.

24. A method according to claim 21 including the steps of:
 delivering from each DTS means receiving said second voice data message a confirmation signal to said VMS means;
 upon failure of said VMS means to receive a predetermined number of confirmation signals, delivering from said VMS means to a monitoring means a signal indicative of said failure.

25. A method according to claim 21 including the step of delivering from said monitoring means a 911 notification.

* * * * *